United States Patent
Renilson et al.

(10) Patent No.: US 9,985,347 B2
(45) Date of Patent: May 29, 2018

(54) BROAD BAND RADOME FOR MICROWAVE ANTENNA

(71) Applicant: CommScope Technologies LLC, Hickory, NC (US)

(72) Inventors: Ian Renilson, Dalgety Bay (GB); John S. Curran, Kirkcaldy (GB); Alastair D. Wright, Edinburgh (GB); Matthew Robert Lewry, Limekilns (GB); Sharon Mackay, Kirkcaldy (GB); Slavi Rumenov Baev, Edinburgh (GB)

(73) Assignee: CommScope Technologies LLC, Hickory, NC (US)

( * ) Notice: Subject to any disclaimer, the term of this patent is extended or adjusted under 35 U.S.C. 154(b) by 699 days.

(21) Appl. No.: 14/527,803

(22) Filed: Oct. 30, 2014

(65) Prior Publication Data

US 2017/0301983 A1    Oct. 19, 2017

Related U.S. Application Data

(63) Continuation-in-part of application No. 14/066,755, filed on Oct. 30, 2013, now Pat. No. 9,583,822.

(51) Int. Cl.
*H01Q 1/42*    (2006.01)
*H01Q 15/16*    (2006.01)

(52) U.S. Cl.
CPC ............ *H01Q 1/424* (2013.01); *H01Q 15/16* (2013.01)

(58) Field of Classification Search
CPC ................................ H01Q 1/42; H01Q 15/16
See application file for complete search history.

(56) References Cited

U.S. PATENT DOCUMENTS

| | | | |
|---|---|---|---|
| 2,614,059 A | 10/1952 | Cooper | |
| 3,002,190 A | 9/1961 | Oleesky et al. | |
| 3,432,859 A | 3/1969 | Jordan et al. | |
| 4,148,039 A | 4/1979 | Lunden | |
| 4,620,890 A | 11/1986 | Myers et al. | |
| 4,872,019 A * | 10/1989 | Chow ................ | H01Q 1/42 343/753 |
| 4,896,164 A | 1/1990 | Burke et al. | |
| 4,980,696 A | 12/1990 | Stone et al. | |

(Continued)

FOREIGN PATENT DOCUMENTS

| | | |
|---|---|---|
| DE | 10 2011 076501 A1 | 11/2012 |
| EP | 0359504 | 3/1990 |

(Continued)

OTHER PUBLICATIONS

European Search Report Corresponding to European Patent Application No. 14 857 784.4; dated May 30, 2017; 10 pages.

(Continued)

*Primary Examiner* — Dieu H Duong
(74) *Attorney, Agent, or Firm* — Myers Bigel, P.A.

(57) ABSTRACT

A radome for an antenna is provided as a composite of an isotropic outer layer and a structural layer of foamed polymer material. The composite is dimensioned to enclose an open end of the antenna. The radome may be retained upon the antenna by a retaining element and fasteners. The outer layer may be a polymer material with a water resistant characteristic. The structural layer may project inward and/ or outward with respect to a plane of the seating surface of the radome.

12 Claims, 20 Drawing Sheets

(56) References Cited

U.S. PATENT DOCUMENTS

| | | |
|---|---|---|
| 5,323,170 A | 6/1994 | Lang |
| 5,408,244 A | 4/1995 | MacKenzie |
| 5,457,471 A | 10/1995 | Epperson, Jr. |
| 5,486,399 A | 1/1996 | Brydon et al. |
| 5,662,293 A | 9/1997 | Hower et al. |
| 5,845,391 A | 12/1998 | Bellus et al. |
| 5,849,234 A | 12/1998 | Harrison et al. |
| 6,107,976 A | 8/2000 | Purinton |
| 6,184,842 B1 | 2/2001 | Leinweber et al. |
| 6,375,779 B1 | 4/2002 | Melquist et al. |
| 6,380,904 B1 | 4/2002 | Ogawa |
| 6,992,640 B2 | 1/2006 | Usami et al. |
| 7,242,365 B1 | 7/2007 | Boatman et al. |
| 7,446,730 B2 | 11/2008 | Yonemoto et al. |
| 7,463,212 B1 | 12/2008 | Ziolkowski |
| 7,554,499 B2 | 6/2009 | Munk et al. |
| 7,656,363 B2 | 2/2010 | Devicque et al. |
| 8,059,049 B2 | 11/2011 | Quan et al. |
| 8,130,167 B2 | 3/2012 | Glabe et al. |
| 2002/0093459 A1 | 7/2002 | Butler |
| 2004/0113305 A1 | 6/2004 | Geyer |
| 2005/0190116 A1 | 9/2005 | Syed et al. |
| 2010/0315307 A1 | 12/2010 | Syed et al. |
| 2011/0140983 A1 | 6/2011 | Hills et al. |
| 2011/0234468 A1 | 9/2011 | Omuro |
| 2011/0285604 A1 | 11/2011 | Le Bayon et al. |
| 2012/0075161 A1 | 3/2012 | Elwell et al. |
| 2012/0262331 A1 | 10/2012 | Kienzle et al. |
| 2013/0002515 A1 | 1/2013 | Hills et al. |

FOREIGN PATENT DOCUMENTS

| | | | |
|---|---|---|---|
| GB | 2 225 902 A | | 6/1990 |
| JP | 10200328 A | * | 7/1998 |
| JP | 2010171860 A | * | 8/2010 |
| WO | WO 2012/163237 A1 | | 12/2012 |

OTHER PUBLICATIONS

European Search Report Corresponding to European Patent Application No. 14 857 532.7; dated May 30, 2017; 10 pages.

Sung Chul Kang, International Search Report for PCT application PCT/US14/62766, dated Jan. 13, 2015, Korean Intellectual Property Office, Metropolitan City, Daejeon, Republic of Korea.

Sung Chul Kang, International Search Report for PCT application PCT/US2014/063020, dated Feb. 26, 2015, Korean Intellectual Property Office, Daejeon Metropolitan City, Republic of Korea.

Office Action corresponding to Chinese Application No. 201480059476.0; dated Dec. 5, 2017; 10 pages.

Office Action corresponding to Chinese Application No. 201480059475.6; dated Dec. 5, 2017; 9 pages.

\* cited by examiner

| Frequency Band | Flat Return Loss | Concentric Step Return Loss |
|---|---|---|
| 7W | -17.73 | -17.95 |
| 11W | -16.75 | -17.28 |
| 13 | -18.57 | -19.24 |
| 15 | -18.18 | -16.52 |
| 18 | -13.7 | -16.3 |
| 23 | -13.74 | -17.55 |
| 26 | -16.1 | -20.53 |
| 28 | -13.25 | -16.3 |
| 32 | -14.23 | -17.32 |
| 38 | -12.57 | -16.35 |
| 42 | -13.56 | -11.26 |

BROAD BAND RADOME FOR MICROWAVE ANTENNA

BACKGROUND

Field of the Invention

This invention relates to microwave reflector antennas. More particularly, the invention relates to a cost-efficient broad band radome for a microwave reflector antenna.

Description of Related Art

The open end of a reflector antenna is typically enclosed by a radome coupled to the distal end (the open end) of the reflector dish. The radome provides environmental protection and improves wind load characteristics of the antenna. Because reflector antennas are often mounted in remote locations, such as high atop radio towers, a radome failure may incur significant repair/replacement expense.

A radome may be tuned to optimize the electrical performance of a reflector antenna, for example by dimensioning the radome surfaces to re-direct RF reflections in a desired direction. The radome materials and/or their thickness may be applied to self-cancel reflections. However, these tuned radomes then become antenna and/or operating frequency specific, requiring design, manufacture and inventory of a large collection of different radomes.

Radomes utilizing a foamed polymer material mated with at least one layer of woven (anisotropic) material providing additional strength are known, for example as missile or aircraft radomes. However, the resulting composite may be significantly stronger and/or more expensive to manufacture than required for a static earth station reflector antenna.

Competition in the reflector antenna market has focused attention on improving electrical performance and minimization of overall manufacturing, inventory, distribution, installation and/or maintenance costs. Therefore, it is an object of the invention to provide a radome that overcomes deficiencies in the prior art.

BRIEF DESCRIPTION OF THE DRAWINGS

The accompanying drawings, which are incorporated in and constitute a part of this specification, illustrate embodiments of the invention, where like reference numbers refer to the same feature or element and may not be described in detail for every drawing figure in which they appear and, together with a general description of the invention given above, and the detailed description of the embodiments given below, serve to explain the principles of the invention.

FIG. 25 is a table of range measurements comparing broadband return loss (in dB) characteristics over a wide range of frequency bands of a flat outer side and flat inner side composite radome in contrast with a flat outer side composite radome with the same outer layer and structural layer materials (0.5 mm polycarbonate film and 25 mm expanded polystryrene foam, respectively), which includes inward projections formed as concentric steps in successive 25 mm step increments.

DETAILED DESCRIPTION

Figure 1:
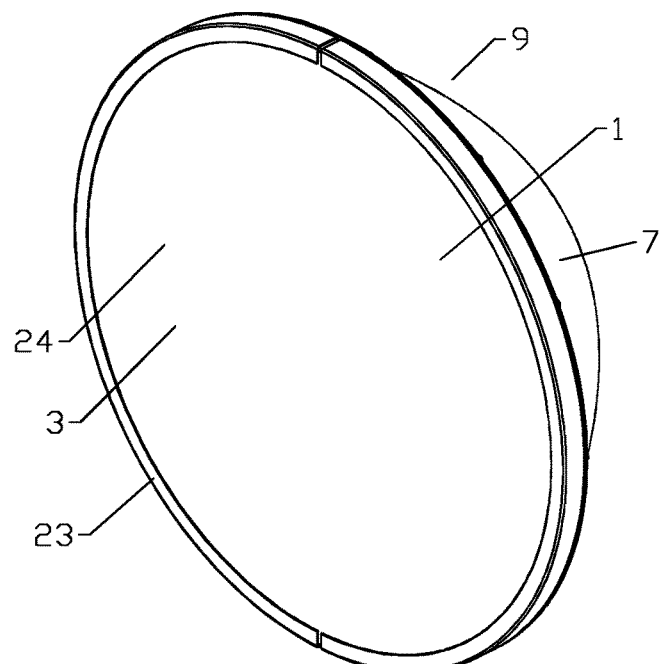
FIG. 1 is a schematic isometric angled front view of an exemplary radome mounted on the reflector dish of a reflector antenna.
Figure 2:
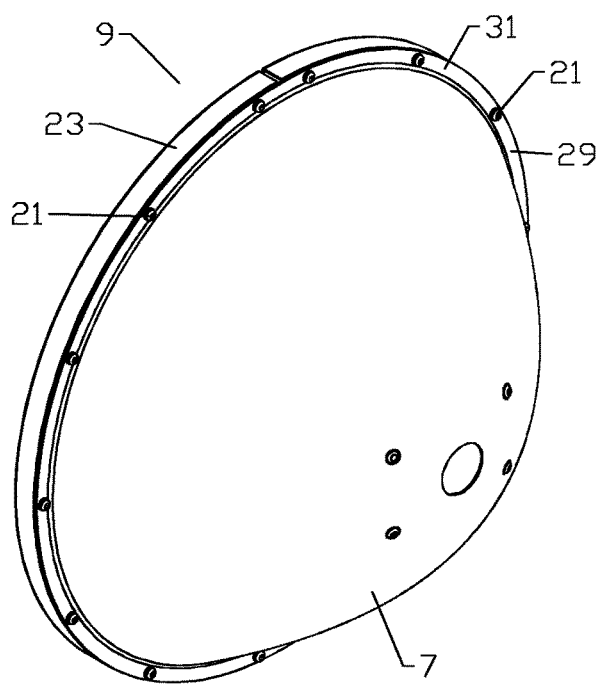
FIG. 2 is a schematic isometric angled back view of the reflector antenna of FIG. 1, with the antenna hub and mounting assembly removed for clarity.
Figure 3:
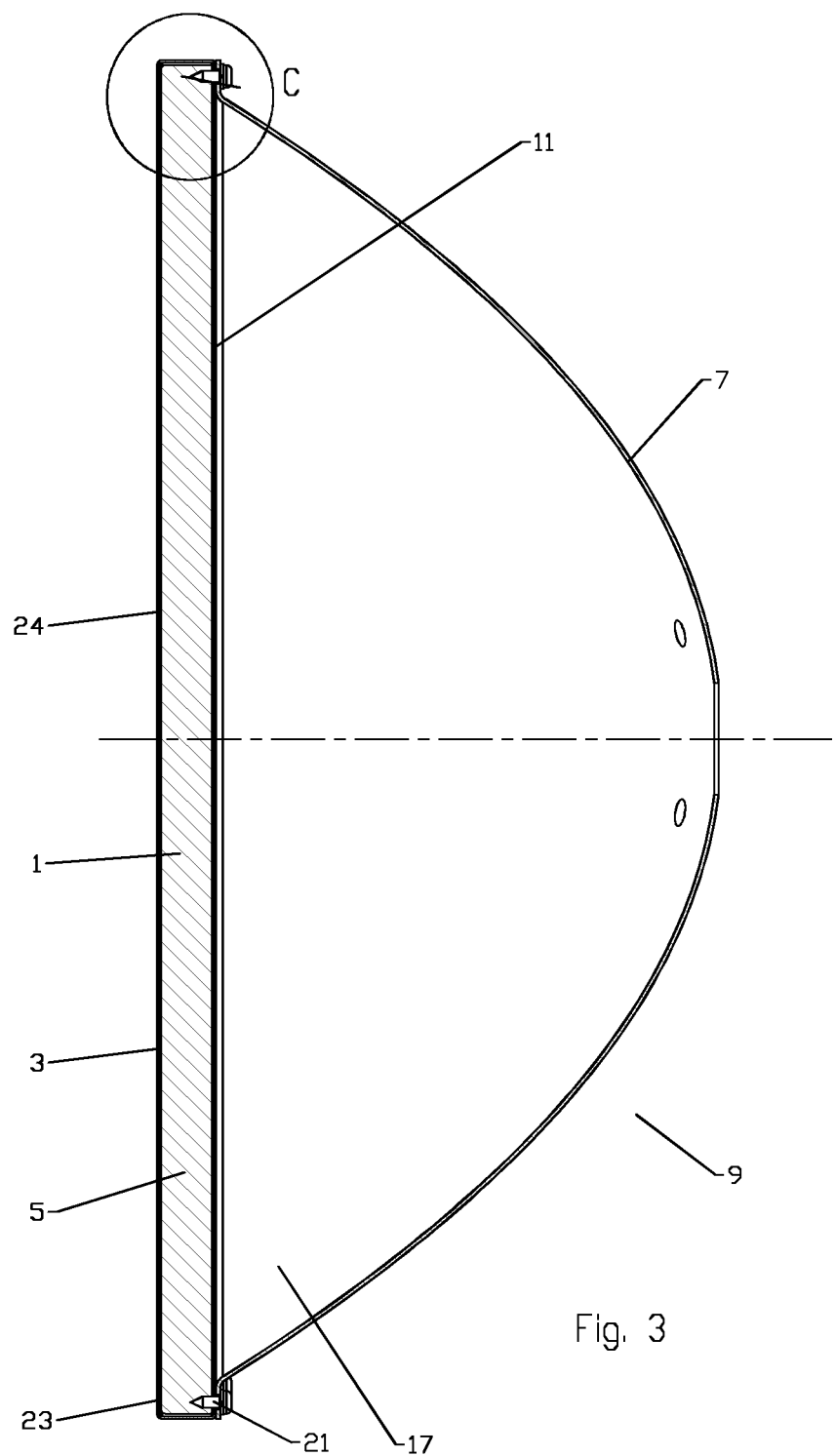
FIG. 3 is a schematic cut-away side view of the reflector antenna of FIG. 1, with the feed assembly, antenna hub and mounting assembly removed for clarity.

The inventors have recognized that a composite of a moisture resistant isotropic film outer layer and a structural layer of low density foamed polymer material can result in a radome with adequate strength which is essentially RF transparent, enabling a single radome to be utilized with a broad range of microwave frequency bands.

As shown for example in FIGS. 1-4, a radome 1 has an isotropic outer layer 3 coupled to a structural layer 5 of foam material that is retained on a reflector dish 7, a seating surface 8 of the radome 1 mating with a retaining flange at the distal end of the reflector dish 7, enclosing an open end of the reflector antenna 9. An isotropic material as applied herein is one in which the material has a substantially homogeneous distribution. That is, the material is not a woven or fiber infused material, but a substantially uniformly distributed homogeneous material, such as a polymer film, coating or the like. The outer layer 3 may be, for example, a polymer and/or blend of polymers, such as polycarbonate, acrylonitrile styrene acrylate, polyvinyl chloride, polymethyl methacrylate, thermoplastic polyolefin, ethylene-vinyl acetate, acrylonitrile-butadiene-styrene or the like.

The outer layer 3 may be a film applied upon the structural layer 5 or a coating sprayed or painted upon the structural layer 5. The outer layer 3 may provide ultra-violet and/or impact protection for the structural layer 5 as well as a moisture barrier to inhibit moisture from being absorbed into the foam material of the structural layer 5, which could otherwise degrade the structural integrity and/or electrical performance of the radome 1. Any outer layer 3 with suitable moisture and ultra-violet radiation resistance characteristics may be applied. Further, the outer layer 3 may include signage and/or graphics for aesthetics and/or marketing purposes. In a balance between moisture resistance and material cost, the outer layer 3 may be provided with a thickness of 0.5 millimeters or less.

Figure 5:
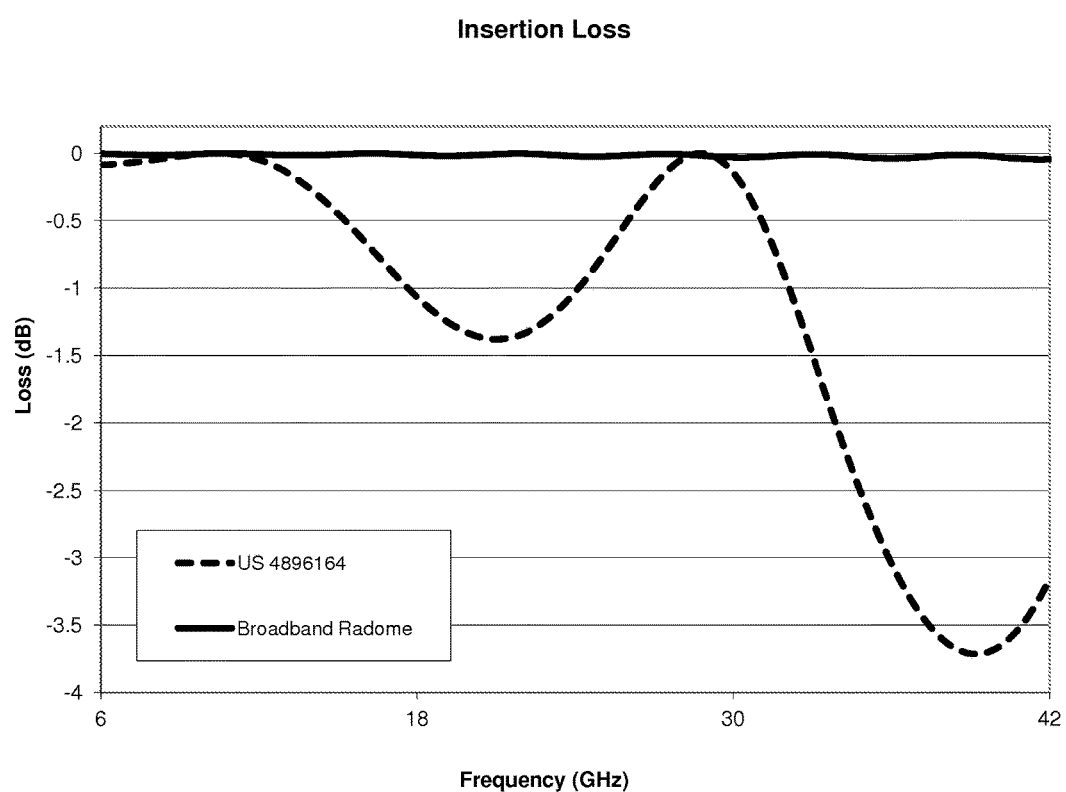
FIG. 5 is a calculated insertion loss chart comparing an exemplary radome to a prior art radome.
Figure 6:
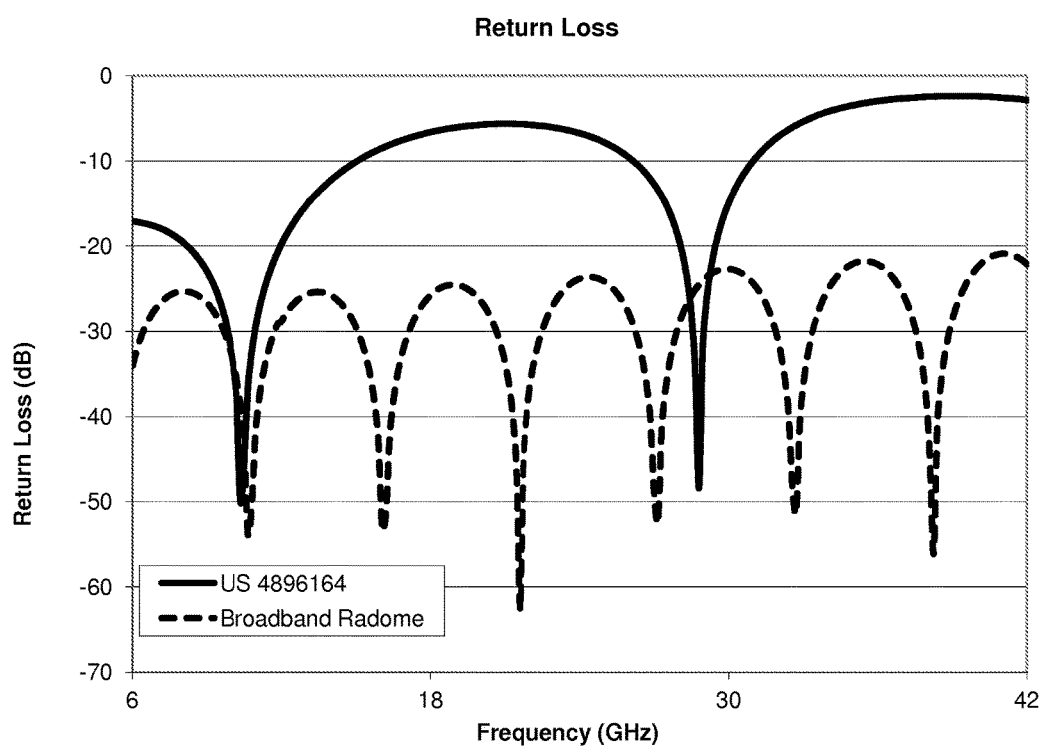
FIG. 6 is a calculated return loss chart comparing an exemplary radome to a prior art radome.

U.S. Utility Pat. No. 4,896,164, "Radar Transparent Window for Commercial Buildings", issued to Burke et al, Jan. 23, 1990, describes a conventional tuned sandwich radome structure (FIG. 2 of U.S. Pat. No. 4,896,164) with interior and exterior layers of polyester resin/E-glass (fiberglass) laminate provided on front and back sides of a rigid polyimide foam with a specific thickness selected with respect to conventional reflection cancellation. In contrast, an exemplary embodiment of a 0.1 mm thick outer layer 3 (2.8 dielectric constant) and 25 mm structural layer 5 (1.11 dielectric constant), with an uncovered signal transmission surface 11 at the inner side 13 has a significantly improved broadband characteristic with respect to insertion and return loss, as demonstrated in FIGS. 5 and 6, respectively. Notably, while the insertion loss of the exemplary embodiment composite radome is minimal over the 36 GHz range between 6 and 42 GHz, the prior tuned structure is effectively unusable outside of two narrow 4 GHz wide bands of 8-12 and 27-31 GHz.

Figure 4:
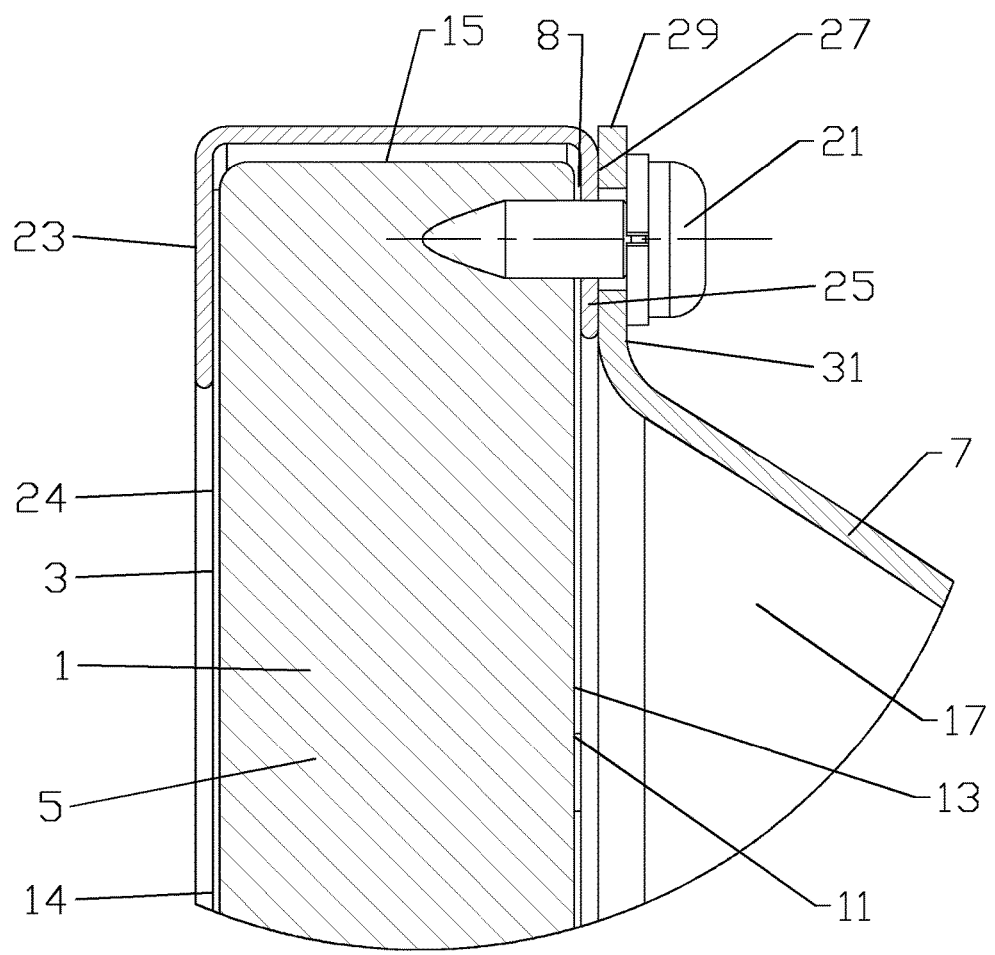
FIG. 4 is a close-up view of area C of FIG. 3.
Figure 7:
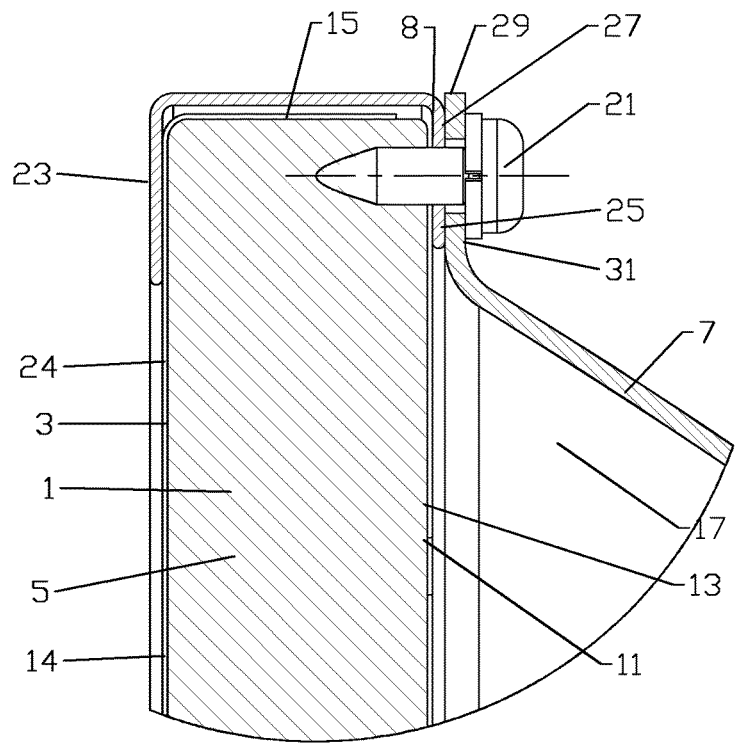
FIG. 7 is a schematic close-up view of an alternative embodiment of a radome coupled to a reflector dish, demonstrating the outer layer extending over the outer diameter of the structural layer.
Figure 8:
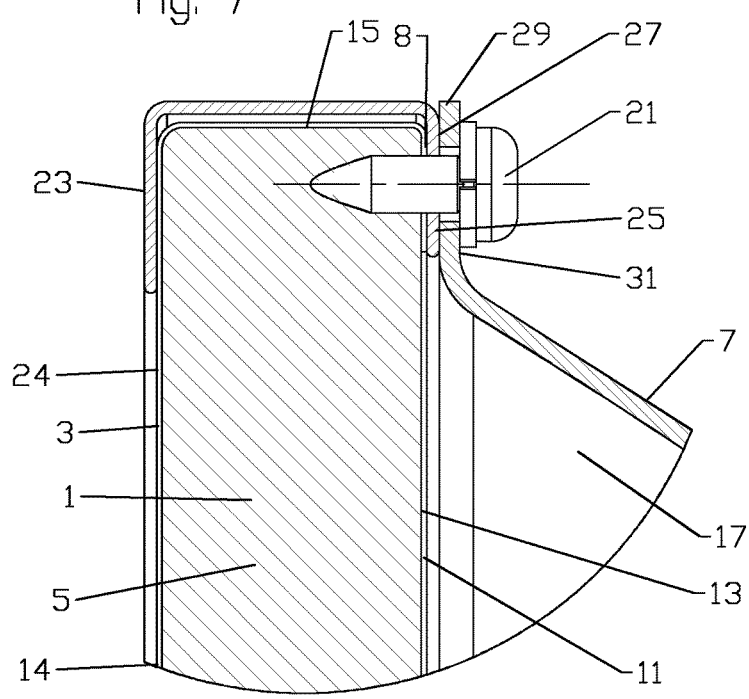
FIG. 8 is a schematic close-up view of an alternative embodiment of a radome coupled to a reflector dish, demonstrating the outer layer extending around the outer diameter to the inner side of the structural layer.

As shown, for example, in FIGS. 4 and 7-8, the outer layer 3 may extend proximate to an outer diameter 15 of the structural layer 5 (FIG. 4), to the outer diameter 15 of the structural layer 5 (FIG. 7) and/or around the outer diameter 15 to the inner side 13 of the structural layer 5, without extending radially inward to the signal transmission surface 11 of the inner side 13 (FIG. 8). With the radome 1 seated upon the open end of the reflector dish 7, the reflector dish 7 provides the remainder of the moisture seal with respect to the cavity enclosed by the radome 1, so that the inner side 13 of the structural layer 5, or just the signal transmission surface 11 of the inner side 13, may be uncovered.

The structural layer 5 may be provided as a foamed polymer such as polystyrene, polyurethane, polyethylene, polypropylene or the like. The structural layer 5 may be provided with a thickness selected with respect to structural properties of the selected material and/or the necessary diameter of the radome to provide a structural strength to the resulting radome 1 which corresponds to a strength and/or rigidity required for the range of environmental conditions expected at the desired reflector antenna 9 installation(s).

The structural layer 5 may be provided with a thickness from a distal end of the reflector dish 7 of at least 2 wavelengths of a minimum operating frequency, such that a conductive retaining element 23 or conductive edge 41 applied at the radome periphery is also operative as a shield portion inhibiting generation of backlobes in the signal pattern of the resulting antenna 9. A 25 mm thick structural layer 5 may be applied, for example, as a compromise thickness for broadband performance.

Figure 9:
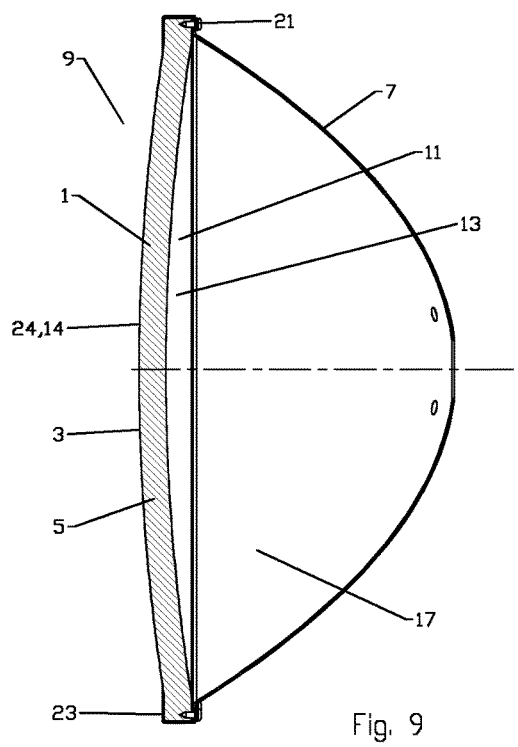
FIG. 9 is a schematic cut-away side view of an alternative embodiment of a radome coupled to a reflector antenna, demonstrating a domed radome profile. The feed assembly, antenna hub and mounting assembly have been removed for clarity.
Figure 10:
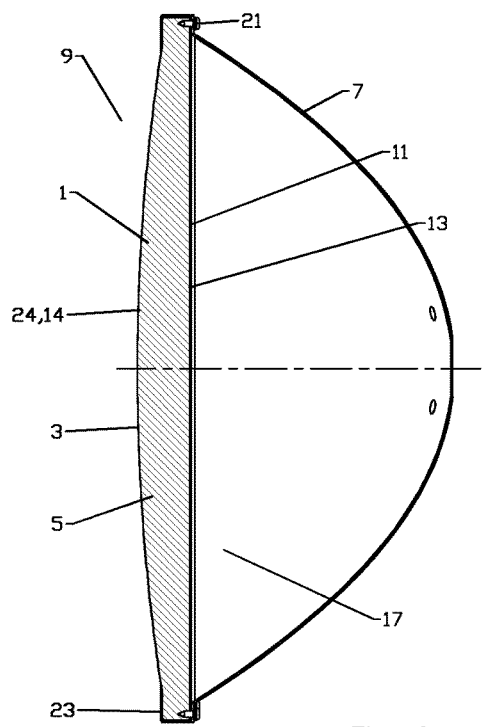
FIG. 10 is a schematic cut-away side view of an alternative embodiment of a radome coupled to a reflector antenna, demonstrating a domed outer radome profile. The feed assembly, antenna hub and mounting assembly have been removed for clarity.
Figure 11:
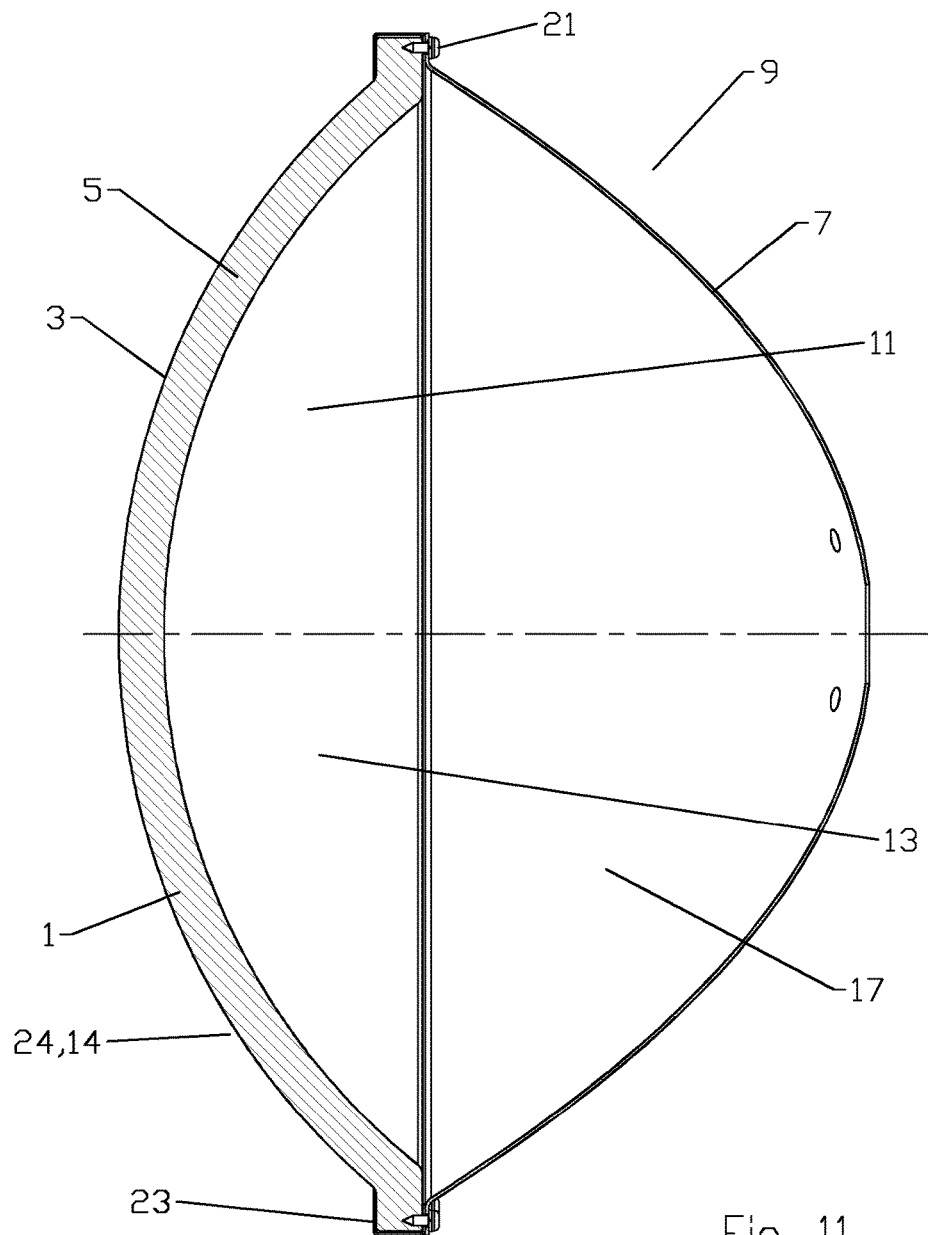
FIG. 11 is a schematic cut-away side view of an alternative embodiment of a radome coupled to a reflector antenna, demonstrating a domed radome profile. The feed assembly, antenna hub and mounting assembly have been removed for clarity.
Figure 12:
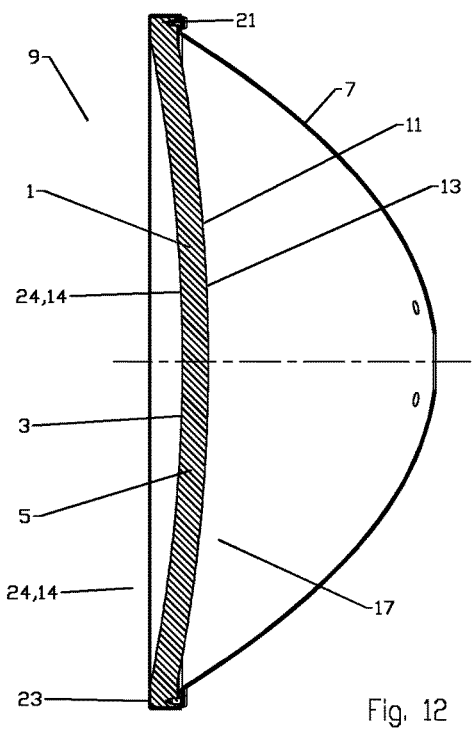
FIG. 12 is a schematic cut-away side view of an alternative embodiment of a radome coupled to a reflector antenna, demonstrating an inwardly domed radome profile. The feed assembly, antenna hub and mounting assembly have been removed for clarity.
Figure 13:
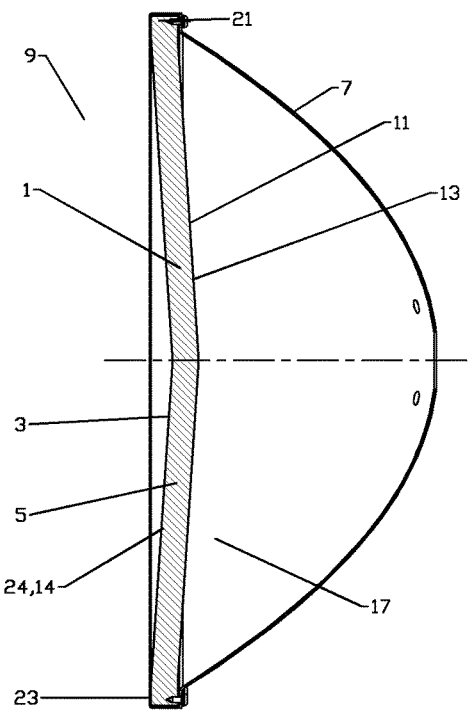
FIG. 13 is a schematic cut-away side view of an alternative embodiment of a radome coupled to a reflector antenna, demonstrating an inwardly conical radome profile. The feed assembly, antenna hub and mounting assembly have been removed for clarity.
Figure 14:
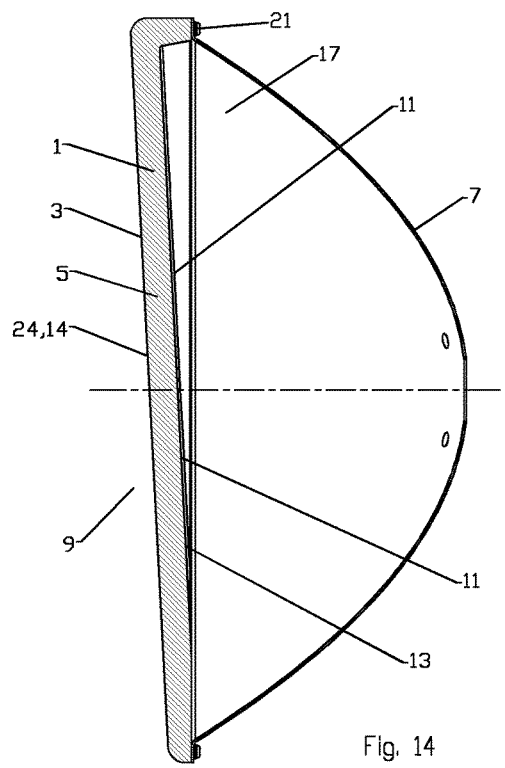
FIG. 14 is a schematic cut-away side view of an alternative embodiment of a radome coupled to a reflector antenna, demonstrating an angled planar face radome profile, with an angled rear face. The feed assembly, antenna hub and mounting assembly have been removed for clarity.
Figure 15:
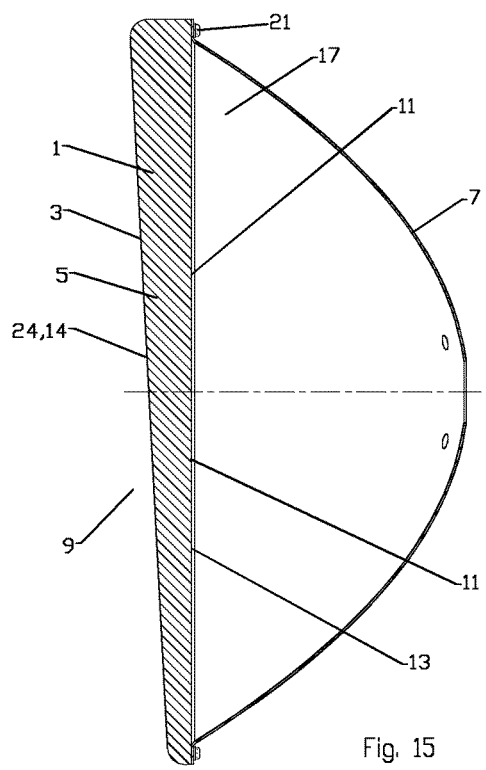
FIG. 15 is a schematic cut-away side view of an alternative embodiment of a radome coupled to a reflector antenna, demonstrating an angled planar face radome profile with a flat rear face. The feed assembly, antenna hub and mounting assembly have been removed for clarity.

The foamed polymer of the structural layer 5 may be cut to size or cost efficiently molded with a high level of precision, in any desired profile. For example, the radome 1 may be provided with a profile configured to extend inwardly or outwardly with respect to the plane of the seating surface 8, along a longitudinal axis of the radome (also the signal beam axis of the reflector antenna 1) to further reduce return loss, enhance wind loading, and/or improve the strength characteristics of the radome. A domed profile may be applied wherein the center of the radome arcs outwardly or inwardly from the periphery of the radome, for example as shown in FIGS. 9-12. The inner side 13 of the radome 1 may be provided flat (FIG. 10) or with a corresponding outward or inward arc (FIGS. 9, 11 and 12). Alternatively, the inward or outward extension of the radome 1 may be conical, for example as shown in FIG. 13, and/or the radome 1 may be provided with an angled front face 24 and angled or flat back face (with respect to a plane of the seating surface 8), for example as shown in FIGS. 14 and 15, which may improve ice shedding and/or return loss characteristics of the reflector antenna 9.

Figure 16:
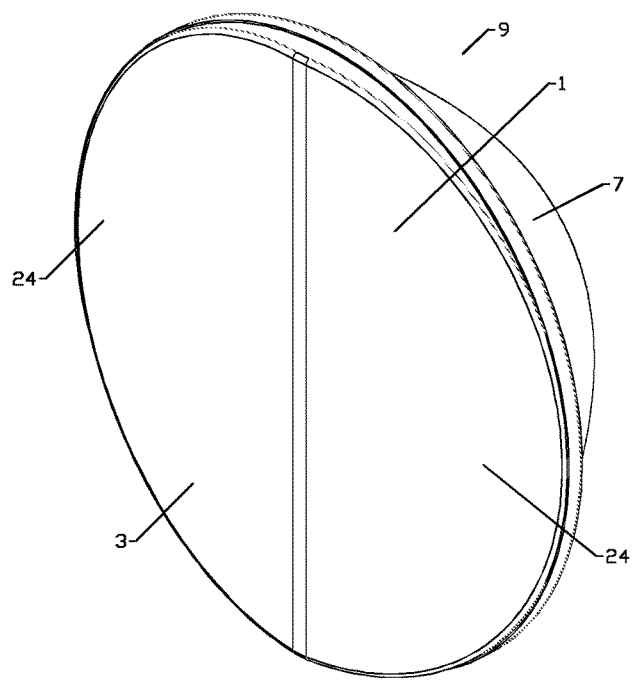
FIG. 16 is a schematic isometric view of an alternative embodiment of a radome coupled to a reflector antenna, demonstrating an angled planar dual face radome profile with flat rear face. The feed assembly, antenna hub and mounting assembly have been removed for clarity.
Figure 17:
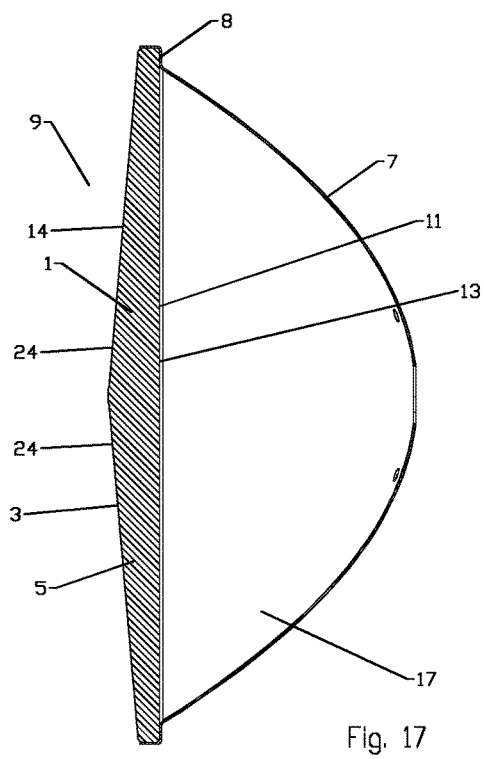
FIG. 17 is a schematic cut-away side view of the reflector antenna of FIG. 16, with the feed assembly, antenna hub and mounting assembly removed for clarity.
Figure 18:
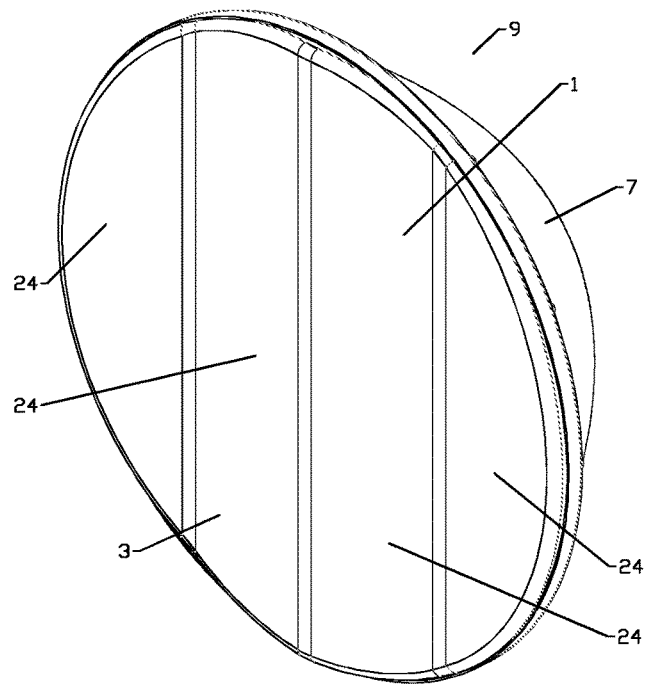
FIG. 18 is a schematic isometric view of an alternative embodiment of a radome coupled to a reflector antenna, demonstrating an angled planar quad face radome profile with a flat rear face. The feed assembly, antenna hub and mounting assembly have been removed for clarity.
Figure 19:
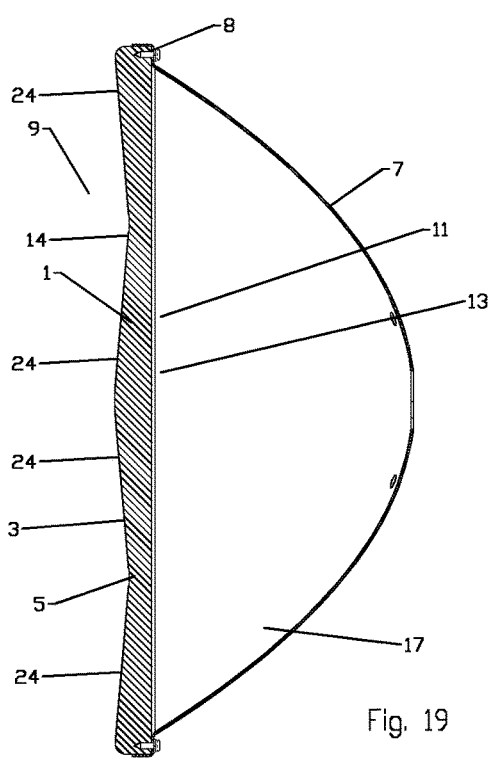
FIG. 19 is a schematic cut-away side view of the reflector antenna of FIG. 18, with the feed assembly, antenna hub and mounting assembly removed for clarity.

The front face 24 may alternatively be provided as a plurality of planar front faces 24. For ease of application of the outer layer 3, the features of the outer side 14 of the structural layer 5, upon which the outer layer 3 is applied, may be provided with each front face 24 aligned with a common axis, such as the vertical axis, so that no creases are generated by projections or cavities which the intersection of non-aligned angled faces may otherwise generate. For example, FIGS. 16 and 17 demonstrate two planar front faces 24 arranged to form a peak extension from the plane of the seating surface 8 parallel to a vertical axis of the radome. Similarly, FIGS. 18 and 19 demonstrate four planar front faces 24 with each planar front face 24 also aligned parallel to a vertical axis of the radome 1. In addition to return loss improvement, planar vertical axis angled front face embodiments may be useful, for example, for addressing undesirable side lobes in the reflector antenna signal pattern.

Figure 20:
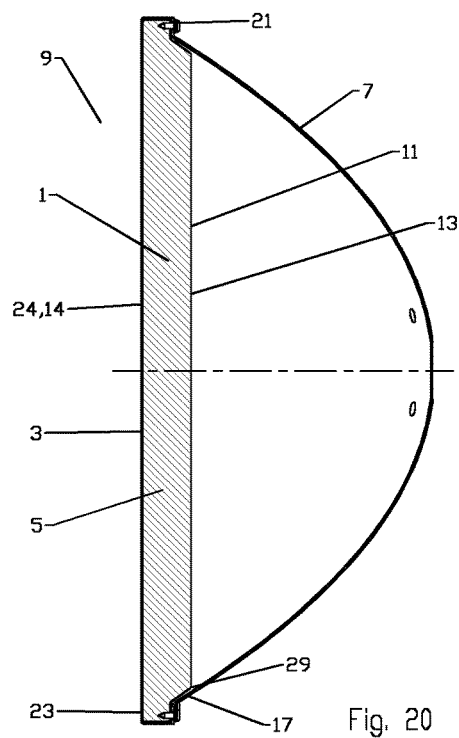
FIG. 20 is a schematic cut-away side view of an alternative embodiment of a radome coupled to a reflector antenna, demonstrating a structural layer projecting inwardly to the signal space of the reflector dish. The feed assembly, antenna hub and mounting assembly have been removed for clarity.
Figure 21:
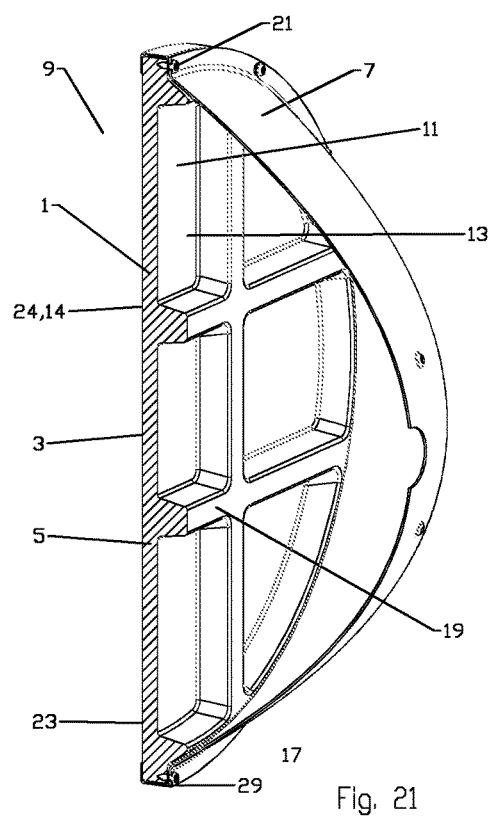
FIG. 21 is a schematic cut-away side view of an alternative embodiment of a radome coupled to a reflector antenna, demonstrating a structural layer projecting inwardly to the signal space of the reflector dish. The feed assembly, antenna hub and mounting assembly have been removed for clarity.

An increased thickness of the structural layer 5, for example for enhanced strength characteristics, without extending the outer dimensions of the reflector antenna 9, may be applied by configuring the inner side 13 of the structural layer 5, in particular the signal transmission surface 11 encircled by the annular seating surface 8, to extend inward with respect to the plane of the seating surface 8, within the signal space of the reflector dish 7. For example, the signal transmission surface 11 at the inner side 13 of the structural layer 5 may be provided with one or more inward projections 19, dimensioned to extend inwardly from the distal end of the reflector dish 7, seating also along the inner signal surface 17 of the reflector dish 7, for example as shown in FIGS. 20 and 21. To minimize material requirements of the thickened structural layer 5, the inward projections 19 of the structural layer 5 may be applied as reinforcing rings and/or ribs, for example as shown in FIG. 21, which extend inward of the plane of the seating surface 8 and the retaining flange 29 of the reflector dish 7 of the antenna, along a longitudinal axis of the radome. To minimize any electrical performance degradation the inward projections 19 may be positioned for reduced presence in primary signal pattern positions, such as the horizontal and vertical axis of the radome.

Figure 22:
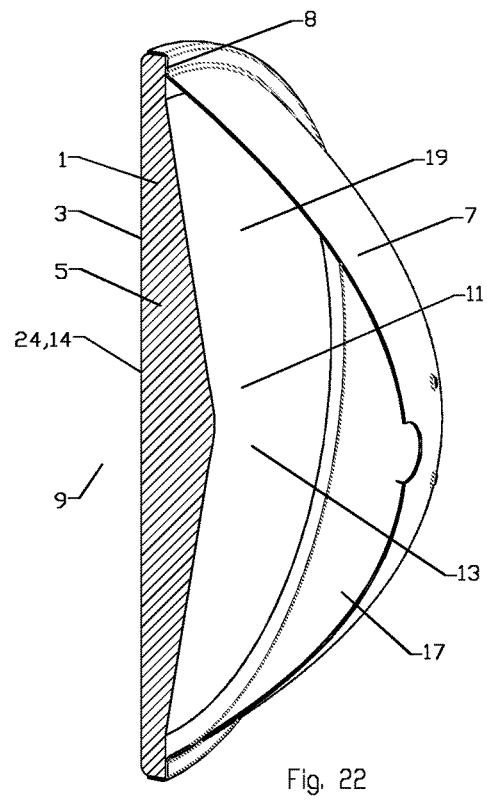
FIG. 22 is a schematic isometric cut-away view of an alternative embodiment of a radome coupled to a reflector antenna, demonstrating a conical inward protrusion. The feed assembly, antenna hub and mounting assembly have been removed for clarity.
Figure 23:
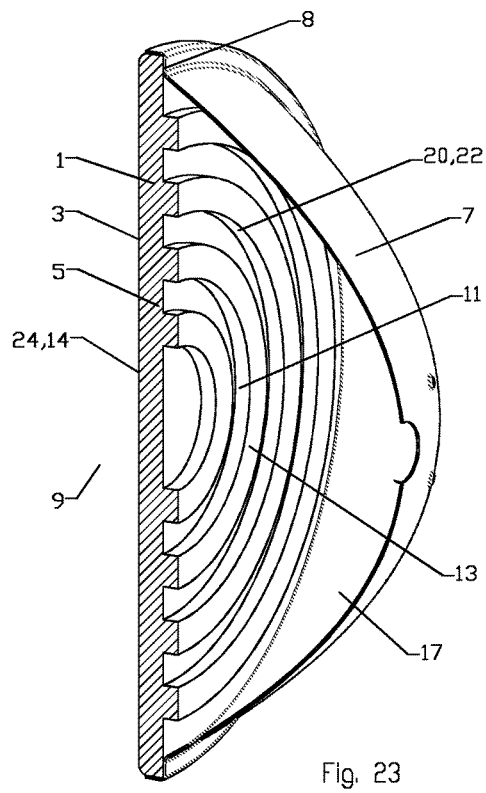
FIG. 23 is a schematic isometric cut-away view of an alternative embodiment of a radome coupled to a reflector antenna, demonstrating concentric ring inward protrusions. The feed assembly, antenna hub and mounting assembly have been removed for clarity.
Figure 24:
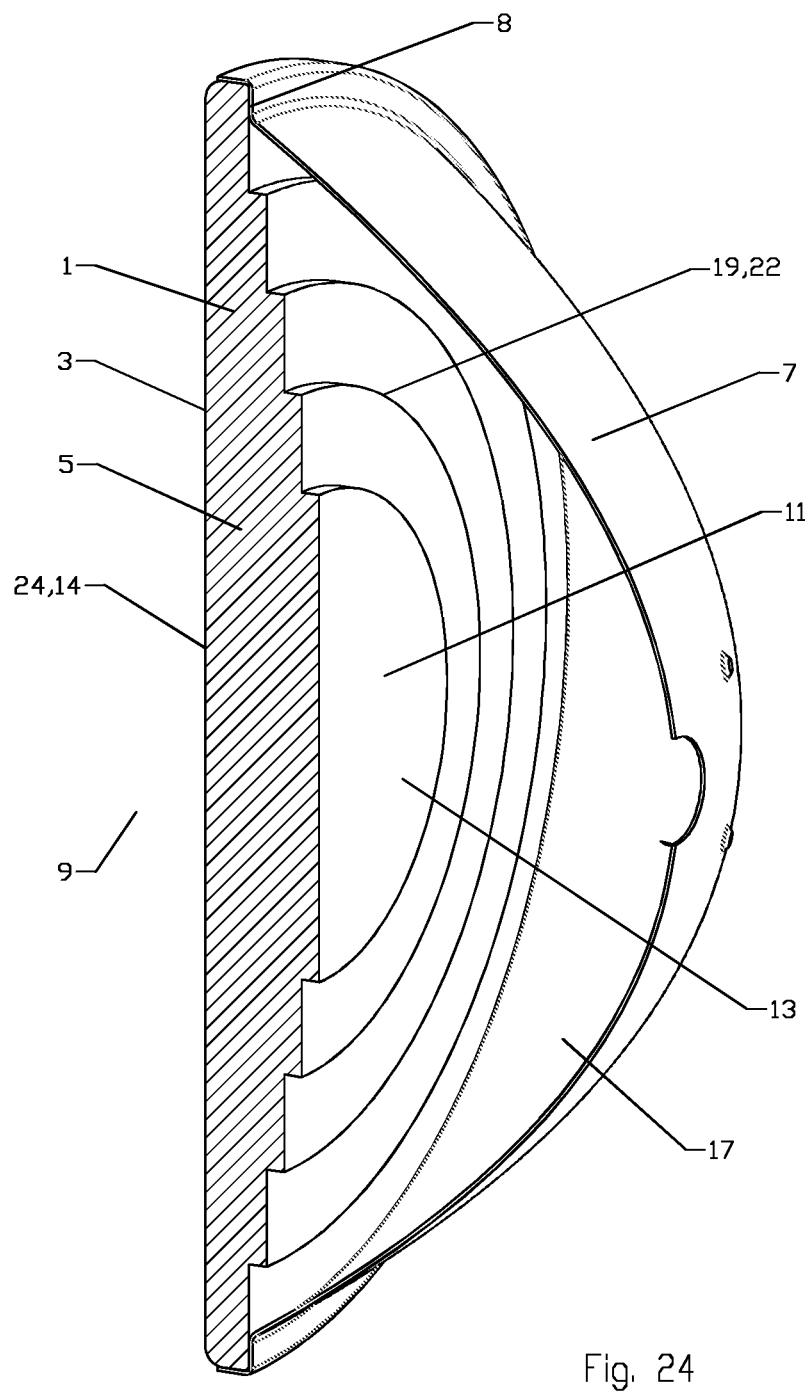
FIG. 24 is a schematic isometric cut-away view of an alternative embodiment of a radome coupled to a reflector antenna, demonstrating concentric step inward protrusions. The feed assembly, antenna hub and mounting assembly have been removed for clarity.

Additional improvement with respect to reducing the return loss characteristics of the radome 1 may be obtained via tuning of the inward projections 19, including, for example, use of conical, annular concentric grooves 20 and/or concentric steps 22, for example as shown in FIGS. 22-24. Range measurements comparing broadband return loss (in dB) characteristics over a wide range of frequency bands of a composite radome 1 with a flat outer side 14 and a flat inner side 13 (see FIG. 3) in contrast with a flat outer side radome with the same outer layer 3 and structural layer 5 materials (0.5 mm polycarbonate film and 25 mm expanded polystryrene foam, respectively), but which also includes inward projections 19 formed as concentric steps 22 in successive 25 mm step increments (generally as shown in FIG. 24) appears in FIG. 25, may demonstrate a significant return loss improvement in a majority of frequency bands, and acceptable performance across all measured frequency bands.

Figure 26:
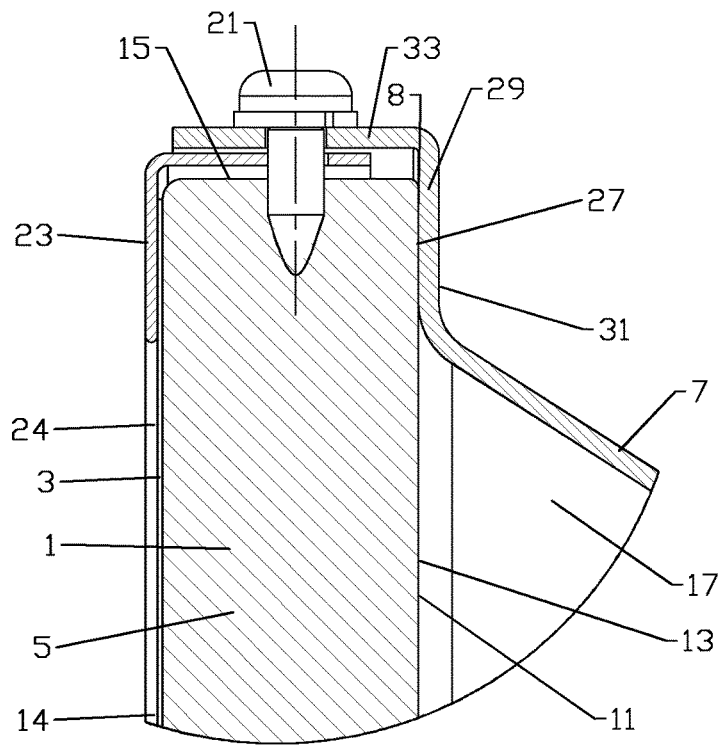
FIG. 26 is a schematic close-up view of an alternative embodiment of a radome coupled to a reflector dish, demonstrating a retaining flange with a periphery portion.
Figure 27:
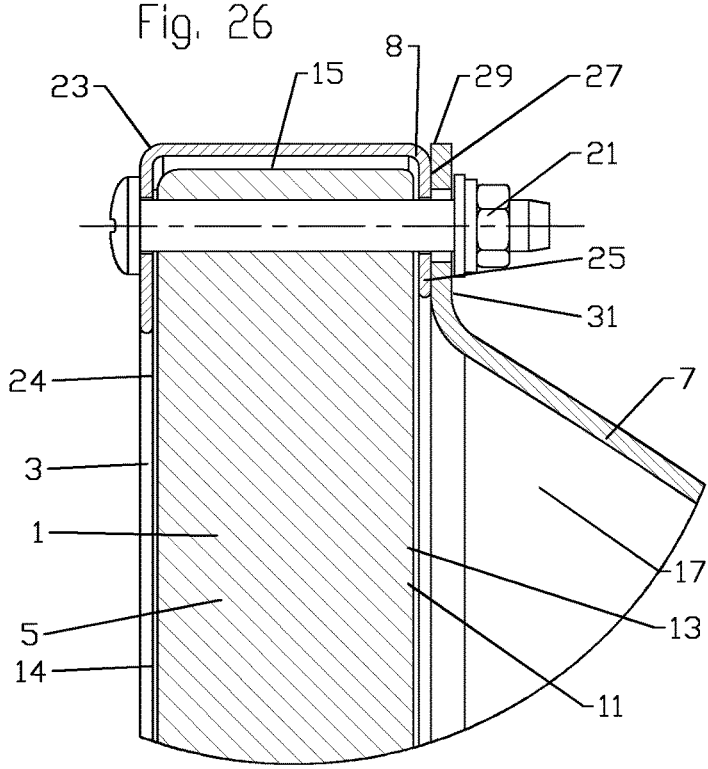
FIG. 27 is a schematic close-up view of an alternative embodiment of a radome coupled to a reflector dish, demonstrating through fastening between the retaining flange and the retaining element.

As shown for example in FIG. 4, the radome 1 may be coupled to the reflector dish 7, retained along the seating surface 8 against the distal end of the reflector dish 7 via fasteners 21 such as screws or the like which retain the radome directly upon the distal end of the reflector dish 7 and/or which secure a retaining element 23, such as a metal band, which may protect the periphery of the radome 1 and/or further secure the radome 1 in place. The fasteners 21 may extend through the retaining element 23 and into the structural layer 5 (FIGS. 4, 26) or fully through the structural layer 5 and two edges of the retaining element 23 (FIG. 27).

Figure 28:
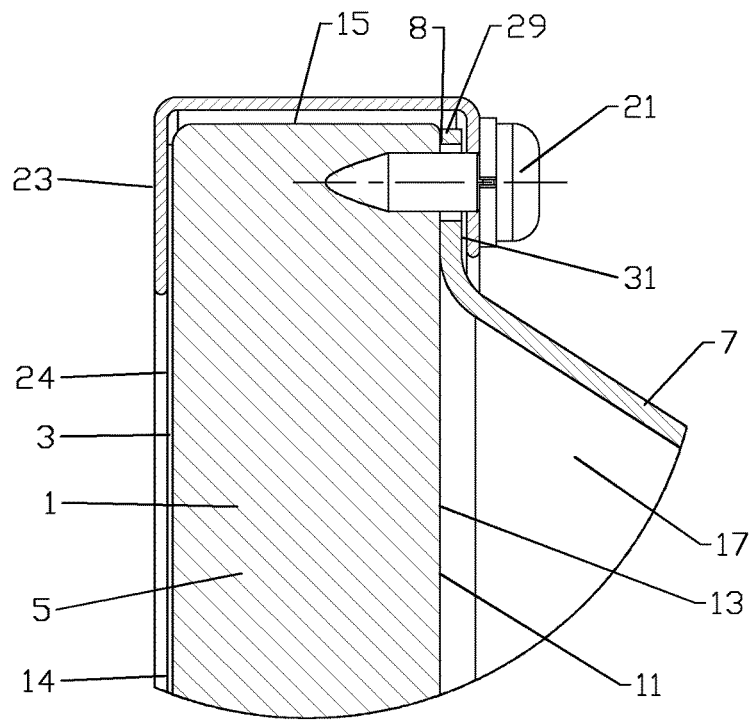
FIG. 28 is a schematic close-up view of an alternative embodiment of a radome coupled to a reflector dish, demonstrating overlapping of the retaining flange and the retaining element.

The retaining element 23 may be applied with an outer edge 25 seated against an outer surface 27 of the retaining flange 29 of the reflector dish 7, for example as shown in FIG. 4. Alternatively, the retaining element 23 may seat against an inner seat surface 31 of the retaining flange 29 (FIG. 28), providing an overlapping mechanical interlock between the elements and extending the path required for signal leakage to occur therebetween. The retaining flange 29 may be formed with a periphery portion 33 coaxial with a longitudinal axis of the reflector antenna 9, enabling the retaining element 23 to be provided with an "L" (rather than "C") cross-section, the retaining element 23 retained by fasteners 21 extending radially inwardly through the periphery portion 33 into the retaining element 23 and further into the radome 1, as shown for example in FIG. 26.

Figure 29:
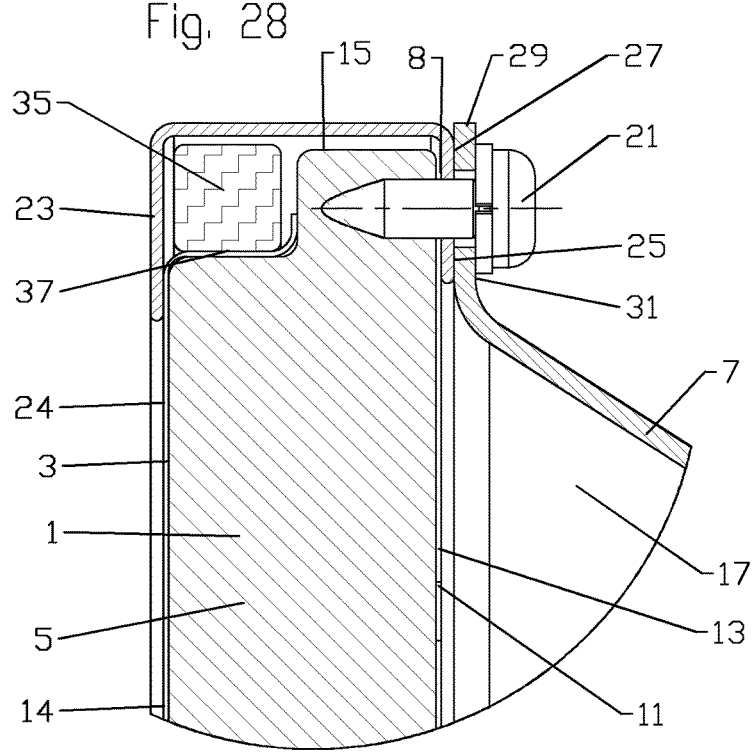
FIG. 29 is a schematic close-up view of an alternative embodiment of a radome coupled to a reflector dish, demonstrating an RF absorber seated in a periphery shoulder of the structural layer.
Figure 30:
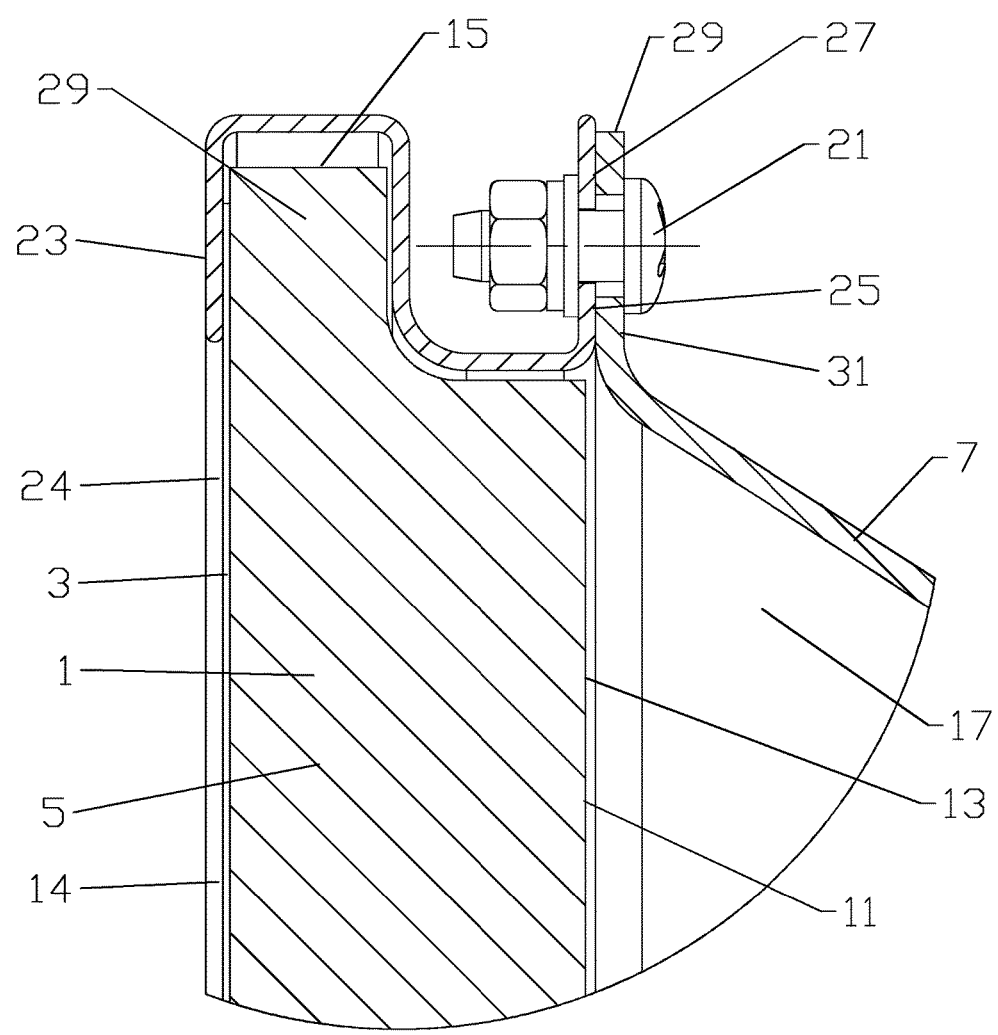
FIG. 30 is a schematic close-up view of an alternative embodiment of a radome coupled to a reflector dish, demonstrating a retaining element with an S-shaped cross-section with inner and outer choke grooves.

The retaining element 23 may also be utilized to retain an RF absorber 35 seated in a periphery shoulder 37 of the radome 1, for example as shown in FIG. 29. The retaining element 23 may be further provided in a generally S-shaped cross-section, dimensioned to provide both an inward and an outward facing choke groove 39 for inhibiting back lobes in the resulting reflector antenna signal pattern, for example as shown in FIG. 30. In addition to electrical performance benefits, this configuration also enables a fastener 21 (provided, for example, as a bolt and nut) to avoid penetrating the structural layer or a signal area of the radome 1, which may avoid secondary sealing issues created by multiple fasteners 21 penetrating through the retaining element 23 into the signal area of the radome 1 itself.

Figure 31:
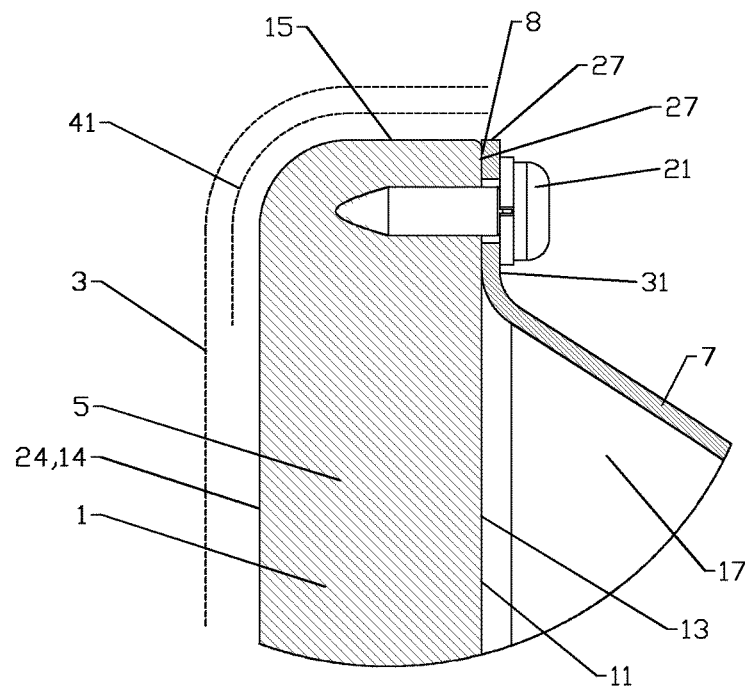
FIG. 31 is a schematic close-up view of an alternative embodiment of a radome coupled to a reflector dish, demonstrating a radome coupled without a retaining element, with a conductive edge and the outer layer represented separate from the structural layer for clarity.
Figure 32:
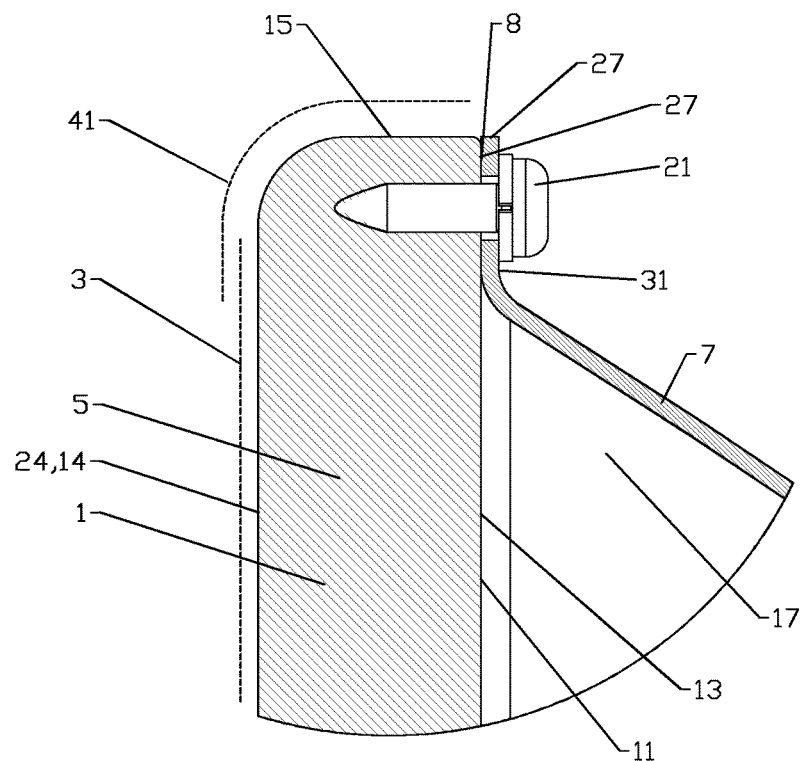
FIG. 32 is a schematic close-up view of an alternative embodiment of a radome coupled to a reflector dish, demonstrating a radome coupled without a retaining element, with a conductive edge and the outer layer represented separate from the structural layer for clarity.

The radome 1 may also be retained on the distal end of the reflector dish, without an additional retaining element 23. Where the retaining element 23 is omitted, a conductive edge 41, formed for example via metalizing, electrodaging, overmolding, metallic paint, foil or the like, may be applied to assist with signal pattern backlobe cancellation either on top of or under the outer layer 3, for example as shown in FIGS. 31 and 32.

The bonding of the outer layer 3 to the structural layer 5 may be secured, for example, by application of an adhesive therebetween and/or integrally with a molding/foaming process of the structural layer 5. For example, an initial molding of the structural layer 5 may be performed and the mold opened for insertion of the outer layer 3. Alternatively, the outer layer 3 may be applied via spraying, either upon the mold or upon the structural layer 5. With the outer layer 3 in place, the mold may be closed again and final molding/foaming completed with an additional time period. Alternatively, the outer layer 3 may be inserted or sprayed into an empty mold and the structural layer 5 molded upon it. Thereby, the composite of the structural layer 5 and outer layer 3 may be formed without use of an additional adhesive. Similarly, the mold may include vacuum-forming functionality to draw the outer layer 3 into the desired extent, either in a separate operation or via vacuum forming the thin film of the outer layer 3 in situ within the mold before the structural layer 5 is foamed on top of it.

Alternatively, the outer layer 3 may be heat shrunk upon the structural layer 5.

One skilled in the art will appreciate that the ability to provide a single cost efficient radome 1, usable on a wide range of operating frequency bands, may enable significant reflector antenna manufacturing cost efficiencies. Further, the self supporting characteristic of the structural layer enables simplified radome to reflector antenna attachment arrangements with electrical performance enhancing characteristics that may also be cost effective and/or easily adaptable to a wide range of different reflector dishes 7.

Although demonstrated via embodiments of Cassegrain reflector antennas, one skilled in the art will appreciate that concepts embodied in the broadband radome 1 may be similarly applied to alternative antenna arrangements also requiring the environmental protection afforded by a radome 1, such as panel and/or horn antennas and the like, with similar benefits and cost efficiencies.

| Table of Parts | |
|---|---|
| 1 | radome |
| 3 | outer layer |
| 5 | structural layer |
| 7 | reflector dish |
| 8 | seating surface |
| 9 | reflector antenna |
| 11 | signal transmission surface |
| 13 | inner side |
| 14 | outer side |
| 15 | outer diameter |
| 17 | inner signal surface |
| 19 | inward projection |
| 20 | groove |
| 21 | fastener |
| 22 | step |
| 23 | retaining element |
| 24 | front face |
| 25 | outer edge |
| 27 | outer surface |
| 29 | retaining flange |
| 31 | inner seat surface |
| 33 | periphery portion |
| 35 | RF absorber |
| 37 | periphery shoulder |
| 39 | choke groove |
| 41 | conductive edge |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. A radome for a reflector antenna comprising a reflector dish, comprising:
a composite of an isotropic outer layer and a structural layer of foam material;
an inner side of the structural layer provided with an annular seating surface;
a signal transmission surface of the structural layer that is encircled by the annular seating surface and that comprises a plurality of annular concentric steps, wherein the annular concentric steps are configured to extend inward into a signal space of the reflector dish, wherein the annular concentric steps progressively decrease in diameter toward a center of the radome, and wherein the annular concentric steps increase in thickness toward the center of the radome.

2. The radome of claim 1, wherein the annular concentric steps are provided as separate disks of foam material.

3. The radome of claim 1, wherein the signal transmission surface is dimensioned to contact an inner signal surface of the reflector dish of the reflector antenna.

4. The radome of claim 1, wherein at least one of the annular concentric steps is dimensioned to contact an inner signal surface of the reflector dish of the reflector antenna.

5. The radome of claim 1, wherein the isotropic outer layer is planar.

6. The radome of claim 1, wherein the isotropic outer layer is angled with respect to a plane of the annular seating surface.

7. The radome of claim 1, wherein the isotropic outer layer extends around a diameter of the structural layer to the annular seating surface.

8. The radome of claim 1, wherein the structural layer is one of polystyrene, polyurethane, polyethylene and polypropylene.

9. A radome for a reflector antenna, comprising:
a composite of an isotropic outer layer and a structural layer of one of polystyrene, polyurethane, polyethylene, and polypropylene;
wherein an inner side of the structural layer is dimensioned to seat against a retaining element of a reflector dish the reflector antenna;
wherein a signal transmission surface of the structural layer faces toward the reflector dish and is free from the isotropic outer layer,
wherein the signal transmission surface comprises a plurality of annular concentric steps that progressively decrease in diameter toward a center of the radome and progressively increase in thickness toward the center of the radome.

10. The radome of claim 9, wherein at least one of the annular concentric steps is dimensioned to contact an inner signal surface of the reflector dish of the reflector antenna.

11. The radome of claim 9, wherein the isotropic outer layer is planar.

12. A radome configured to couple to a reflector dish of a reflector antenna, the radome comprising:
   an isotropic outer layer bonded to an outer side of a structural layer of foam material;
   wherein a signal transmission surface that is opposite the outer side of the structural layer faces toward the reflector dish and is free from the isotropic outer layer,
   wherein the signal transmission surface comprises a plurality of annular steps concentric about a longitudinal axis of the radome,
   wherein an innermost step of the plurality of annular steps comprises a smallest diameter of the plurality of annular steps and a largest horizontal thickness of the plurality of annular steps.

* * * * *